UNITED STATES PATENT OFFICE.

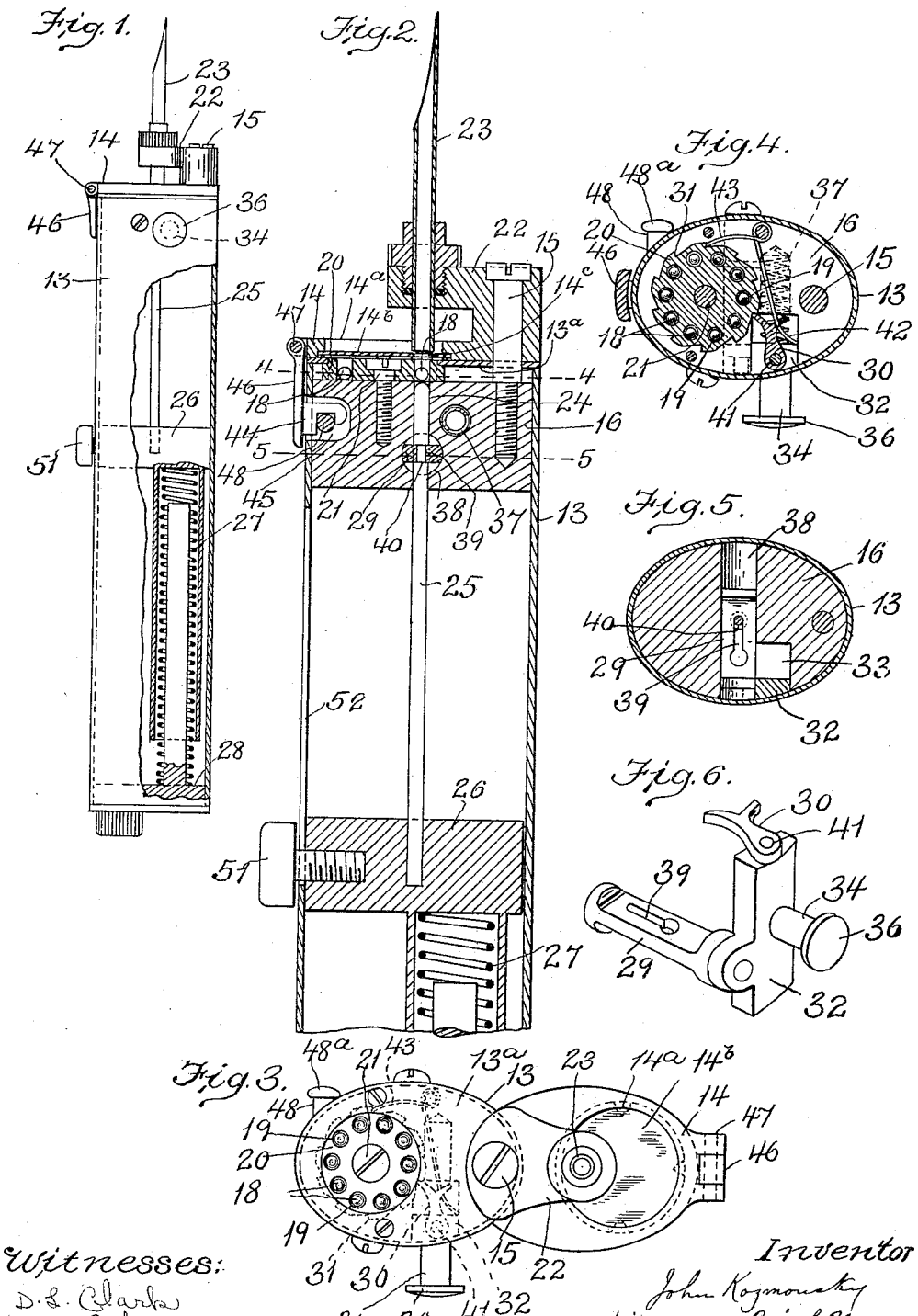
J. KOZMOUSKY.
PILL INJECTOR.
APPLICATION FILED MAR. 8, 1913.
1,109,072.
Patented Sept. 1, 1914.

JOHN KOZMOUSKY, OF BOSTON, MASSACHUSETTS.

PILL-INJECTOR.

1,109,072. Specification of Letters Patent. Patented Sept. 1, 1914.

Application filed March 8, 1913. Serial No. 752,955.

*To all whom it may concern:*

Be it known that I, JOHN KOZMOUSKY, a citizen of the United States, and resident of Boston, in the county of Suffolk and State of Massachusetts, have invented certain new and useful Improvements in Pill-Injectors, of which the following is a specification.

This invention relates to means for injecting small pills or pellets into the tissues of animals for curative purposes, and has for its object to provide a compact and efficient injector for the purpose stated, adapted to hold a charge of pills and to inject the same, one at a time, until the charge is exhausted.

The invention consists in the improvements which I will now proceed to describe and claim.

Of the accompanying drawings which form a part of this specification: Figure 1 represents a side elevation partly broken away of a pill injector embodying my invention; Fig. 2 represents a longitudinal section of a portion of the same showing the relative positions of the parts before the injecting operation; Fig. 3 represents an end view of the injector showing the pivoted head displaced; Fig. 4 represents a section on line 4—4 of Fig. 2; Fig. 5 represents a section on line 5—5 of Fig. 2; and Fig. 6 represents an enlarged perspective view of the operating member hereinafter referred to.

Similar reference characters indicate the same or similar parts in all the figures.

13 represents a tubular casing which is preferably elliptical in cross section and formed to be held by the operator's hand.

14 represents a head which covers one end of the casing and is mounted to swing on a pivot 15 engaged with a block or partition 16 within the casing. The head 14 has a sight opening 14$^a$ in which is fitted a transparent filling 14$^b$ of celluloid or other suitable material which permits an inspection of a rotary pill feeder 20 adapted to contain a charge of pills or pellets 18, said pills being contained in pockets 19 in the rotary pill feeder. Said feeder, as here shown, is a disk mounted to rotate on a stud 21 affixed to the block 16, the pill pockets 19 being a circular series of orifices formed in the disk. The casing 13 has a fixed cap 13$^a$ having an orifice into which the outer portion of the pill feeder projects, said orifice closely fitting the periphery of the feeder. The transparent filling 14$^b$ covers the outer side of the feeder 20, and the inner side of the feeder bears on the block 16, so that the pellets are confined in the pockets by said filling 14$^b$ and block 16, these parts constituting opposite walls of a pill chamber.

The head 14 is provided with an angular arm 22 which partially overhangs the sight opening and is apertured to receive a pointed tubular needle 23 adapted to penetrate the tissues into which the pills are to be injected, the inner end of the needle being in close proximity to the filling 14$^b$, which has an orifice 14$^c$ coinciding with the needle and constituting a pill outlet of which the needle is an extension.

The block 16 is provided with a central orifice 24 constituting a guide for a plunger 25, said guide being in alinement with the pill outlet. The axis of the feeder 20 is at one side of the path of the plunger 25, the arrangement being such that a step-by-step rotation of the feeder brings the pockets therein successively into the path of the plunger. When the plunger is projected it passes through the pocket in alinement with it into the outlet 14$^c$ and needle 23, and forces a pill through said needle. The plunger is affixed to a head 26, which is movable in the casing 13, and is normally projected by means of a spring 27 seated on the closed inner end 28 of the casing.

The block 16 is utilized as a support and guide for an operating member which includes a detent 29 adapted to hold the plunger in a retracted position, and a pawl 30, adapted to impart a partial rotation to the feeder 20, the latter being provided with ratchet teeth 31 on its periphery. The detent 29 is an arm affixed to a slide 32 which is movable in a guiding cavity 33 in the block 16, said slide being provided with a stem 34 projecting through the wall of the casing and having a head 36 at its outer end, the said block, stem and head being for convenience hereinafter referred to as a push piece and being normally retracted by means of a spring 37. The detent arm 29 is fitted to slide in a guide 38, in the block 16, and has a key-hole shaped slot 39 through which the plunger passes. When the push piece is retracted, the narrow end of the slot 39 engages a shoulder 40 on the plunger, said shoulder being formed by cutting a peripheral groove in the plunger. The detent when in this position therefore engages the plunger and holds it retracted. The larger end of the slot 39 is formed to permit the plunger to pass freely through it when the detent arm is projected. The pawl 30 is pivoted at 41 to the slide 32, and is pressed by a spring 42 against the ratcheted periphery of the feeder 20.

It will now be seen that when the operating member or push piece is pushed inwardly, the pawl 30 is caused to impart a partial rotation to the pill feeder, bringing a pocket and a pill therein into alinement with the plunger and pill outlet, and that the detent arm is at the same time moved to bring the larger end of its slot 39 into alinement with the plunger, the arrangement being such that the plunger is released immediately after the completion of the partial rotation of the feeder. Provision is thus made for first feeding a pill to position to be ejected, and for then releasing the plunger. The guide 38, in which the detent arm moves, is formed to support the arm laterally against the pressure of the spring-pressed plunger against it. Accidental backward movement of the feeder is prevented by a spring stop pawl 43.

Owing to the fact that the head 14 forming the outer side of the pill chamber is pivoted, the pill chamber may be readily opened to permit insertion of the charge of pills. The head is retained in its operative position by a locking bolt 44 adapted to enter an orifice 45 in the block 16. Said bolt is carried by an arm 46 hinged at 47 to the head 14. A spring pressed detent 48, movable in the block 16, enters a notch in the bolt 44 to lock the latter, the detent being movable sidewise and provided with a head 48ª by which it may be displaced to release the bolt.

When the head 14 is displaced, the pills may be dropped into the pockets 19, and when the head is replaced the transparent filling 14ᵇ retains the pills in the pockets and permits an inspection of the same.

51 represents a handle attached to the head 26 to enable the plunger to be conveniently retracted. The casing is provided with a longitudinal slot 52 in which the handle 51 is movable.

I claim:

1. A pill injector comprising a casing having a pill chamber, a pill outlet and a plunger guide, said outlet and guide being in alinement with each other, a spring projected plunger movable in the guide and outlet, a movable detent adapted to hold the plunger retracted, a pill feeder movable in said chamber and having a series of pill pockets which are movable successively into the path of the plunger, and means for successively moving the feeder to bring one of its pockets into the path of the plunger, and displacing the detent to permit the projection of the plunger.

2. A pill injector comprising a casing having a pill chamber, a pill outlet and a plunger guide, said outlet and guide being in alinement with each other, a spring projected plunger movable in the guide and outlet, a rotary pill feeder journaled in the chamber at one side of the path of the plunger and having a concentric series of pill pockets and a peripheral series of ratchet teeth, and a movable operating member having a detent which normally engages the plunger to hold it retracted, and a pawl engaged with the ratcheted periphery of the feeder, and adapted to rotate the latter step-by-step, the arrangement of said pawl and detent being such that a movement of the operating member successively moves the feeder and releases the plunger.

3. A pill injector comprising a casing having a pill chamber, a pill outlet and a plunger guide, said outlet and guide being in alinement with each other, a spring projected plunger movable in the guide and outlet, a rotary pill feeder journaled in the chamber at one side of the path of the plunger and having a concentric series of pill pockets and a peripheral series of ratchet teeth, and a spring-pressed push piece having a keyhole shaped slot through which the plunger passes, the narrower portion of said slot constituting a detent engaging a groove in the plunger, and a pawl pivoted to the push piece and held in yielding engagement with the ratcheted periphery of the feeder, the spring controlling the push piece normally holding the detent in engagement with the plunger, and the pawl in a retracted position.

4. A pill injector comprising a casing having a fixed block or partition forming the inner side of a pill chamber, a head pivoted to the casing and forming the outer side of said chamber, the head being displaceable to open the chamber, and provided with a sight opening having a transparent filling in which a pill outlet is formed, a rotary pill feeder journaled in the chamber under said filling, and having a circular series of pill pockets, and a plunger movable in the casing and adapted to be projected into the pill feeder and outlet.

5. A pill injector comprising a casing having a pill chamber at one end, and an internal plunger guide, the outer side of the chamber being provided with a pill outlet coinciding with said guide, a rotary ratchet-toothed pill feeder in the chamber, a spring pressed push piece movable in a guide in said block and provided with a pawl engaged with the periphery of the feeder, and with a detent adapted to engage and release the plunger.

6. A pill injector comprising a casing having a pill chamber at one end and an internal plunger guide, the outer side of the chamber being provided with a pill outlet coinciding with said guide, a rotary ratchet-toothed pill feeder in the chamber, a spring pressed plunger movable in said guide, and a spring pressed push piece movable in a guide in said block and provided with a pawl engaged with the periphery of the feeder, and with an arm formed as a detent adapted to engage and release the plunger, the block being provided with a guide which not only permits endwise movements of the detent arm, but also supports the same against the pressure of the plunger spring.

7. A pill injector comprising a casing having a fixed block or partition forming the inner side of a pill chamber, and a movable head forming the outer side of said chamber, and provided with a pill outlet, a pill feeder movable in said chamber, a plunger movable in the casing and adapted to projected into the pill feeder and outlet, the cap being displaceable to expose the feeder, an arm hinged to the cap and having a notched bolt adapted to enter an orifice in the said block, and a detent movable in the block to engage the notched bolt.

In testimony whereof I have affixed my signature, in presence of two witnesses.

JOHN KOZMOUSKY.

Witnesses:
D. L. CLARK,
P. W. PEZZETTI.